April 26, 1966  R. W. BATTEN  3,247,741
MACHINE WRENCH WITH TORQUE REACTION MEANS
Filed April 16, 1963
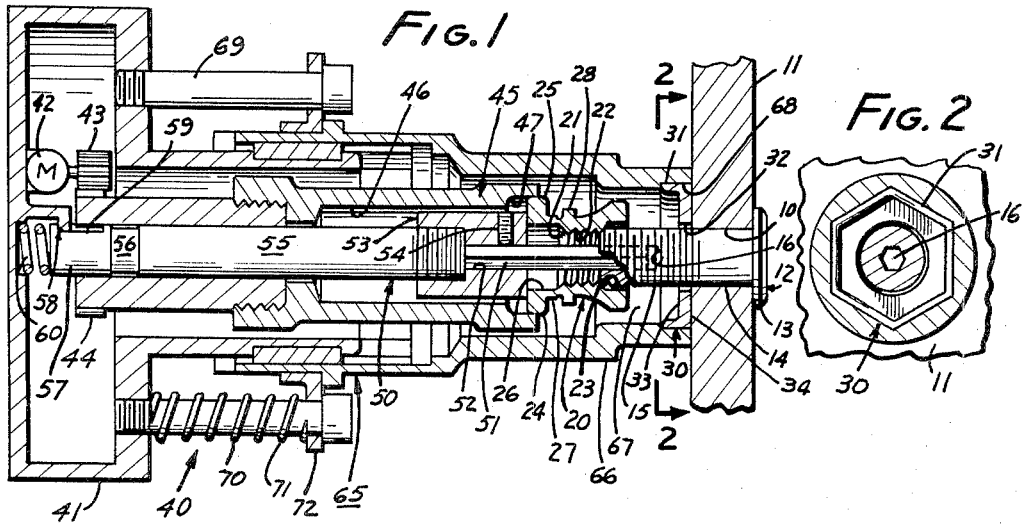
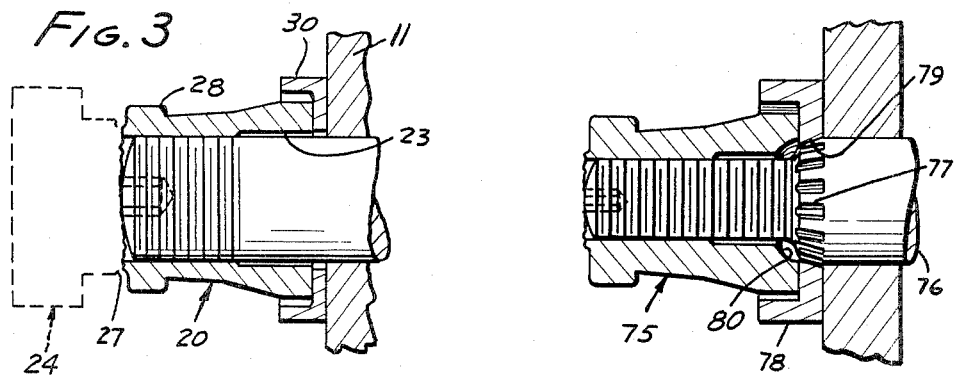
INVENTOR.
RONALD W. BATTEN
BY
ATTORNEYS.

United States Patent Office 3,247,741
Patented Apr. 26, 1966

3,247,741
MACHINE WRENCH WITH TORQUE REACTION MEANS
Ronald W. Batten, Torrance, Calif., assignor to Hi-Shear Corporation, Torrance, Calif., a corporation of California
Filed Apr. 16, 1963, Ser. No. 273,344
5 Claims. (Cl. 81—56)

This invention relates to a fastener system, and in particular to a fastener system in which a threaded fastener is set to a predetermined torque and axial preload, the values of which are inherently limited.

Threaded fasteners with inherent means for limiting the torque applicable thereto are known from George S. Wing Patent No. 2,940,495, issued June 14, 1960. A characteristic of this type of fastener is the inclusion therein of two sections, one which is threaded and the other of which is provided with wrench-engaging means. The fastener is set by applying a wrench to the latter section in order to turn the fastener onto a threaded pin. Between these two sections, there is provided a section of reduced cross-sectional area, usually a groove, this being a zone of weakness adapted to shear at a predetermined torque value. When the fastener is tightened down to this torque value, this section shears, thereby freeing the wrench-engaging section from the threaded section, leaving the threaded section on the pin at a predetermined torque value, and loading the pin with a predetermined axial preload. The wrench-engaging section falls clear so that no additional torque can be applied to the fastener.

Fasteners of this general type have achieved a wide acceptance in the trade, particularly in ship building and aircraft. They are customarily set by tools such as that shown in Wing Patent No. 2,882,773, issued April 21, 1959. In this type of device, there is generally provided a rotating wrench to engage the wrench-engaging section and turn it, and also a pin-engaging shaft which is adapted to engage the pin, and recede toward the frame of the tool as the tool advances toward the fastener. As the torque builds up to a predetermined value, with the use of this type of tool, an equal torque must be exerted by the tool operator and then when the shear section fails, the torque is instantly released. On small fasteners in which the section shears at a torque on the order of a few inch pounds, this shock is not particularly great. However, stronger fasteners are often set with torques on the order of 1000–1200 inch pounds. To resist the torque and withstand the shock, the tool is sometimes provided with long lever arms. This is, of course, an undesirable situation, and it is an object of this invention to correct it.

In this invention, means is provided for making the force-reaction system completely self-contained within the fastener and driver so that it is not "felt" by the operator. This dispenses with the need for levers arms and exertion to withstand the torque and the shock.

A fastener system according to this invention includes a pin adapted to pass through an apertured workpiece having threads adjacent to an end thereof. A collar has a central passage and internal threads therein adapted to engage the threads on the pin. A driving section on the collar is adapted to be driven by a rotary wrench. In the preferred embodiment, a shear section is provided in the collar between the internal threads and the driving section, the shear action being a region of least cross-section adapted to shear at a given torque exerted across it. This permits the driving section to be separated from the remainder of the collar when a predetermined torque level is reached. In optional embodiments, a torque limiting feature may be provided elsewhere in the system.

A washer is adapted to surround the piece and stand between the collar and the workpiece so as to bear against both of them. Means is provided for holding the washer against rotation around the pin, and a driver is provided for turning the wrench in order to rotate the collar relative to the pin. When the collar tightens down against the washer and presses it firmly against the workpiece, then the torque load is exerted through the wrench, through the collar, and through the means for holding the washer against rotation and back through the frame, so that the entire torque load is maintained within the frame of the driver, thereby isolating the frame externally from the torque load, and therefore also from the shock which occurs when the driving section is released from the remainder of the collar. The operator "never feels" it, and this is in direct contrast to the circumstance in the prior art wherein the frictional resistance between tool frame and collar as the collar is tightened down must be resisted by the operator through the frame. In the prior art, this resistance builds up to the ultimate torque applied to the collar. The frame is not restrained from turning, except by the operator. This is the principal functional distinction between the prior art and this invention.

According to an optional feature of this invention, the means for holding the washer against rotation comprises non-circular sections on the washer and on the pin, the non-circular sections being adapted to engage each other, the pin being held against rotation relative to the frame.

According to a preferred but optional feature of this invention, the means comprises an engagement portion on the washer adapted to be engaged by an external device mounted to the frame.

According to still another preferred but optional feature of the invention, the engagement portion comprises a non-circular peripheral surface adapted to be engaged by a wrench.

The above and other features of this invention will be fully understood from the following detailed description and the accompanying drawings in which:

FIG. 1 is a side elevation, partly in cutaway cross-section, showing the presently preferred embodiment of the invention;

FIG. 2 is a cross-section taken at line 2—2 of FIG. 1;

FIG. 3 shows a portion of FIG. 1 with the collar in its set configuration; and

FIG. 4 shows an alternate embodiment of the invention in its set configuration.

FIG. 1 illustrates the presently preferred embodiment of the invention. Its objective is to set a fastener in an aperture 10 formed in a workpiece 11. It will be understood that this workpiece may be one or a stack of sheets or plates which it is desired to hold together, or any other type of body. A pin 12 has a head 13, a shank 14, and external threads 15 adjacent to one end thereof. Its shank passes through and extends beyond aperture 10. It will be understood that a headed shank is but one embodiment of a pin suitable for this invention and that the term "pin" includes not only headed constructions but also studs which are frictionally, threadedly, or otherwise affixed to workpieces.

The pin includes a concave engagement section 16 which is preferably an Allen head type recess, which may conveniently be hexagonal.

A collar 20 identical to that shown in the aforesaid Wing Patent No. 2,940,495 is intended to be threaded onto the pin and preset to a predetermined torque. Full details of this collar will be found in this aforesaid Wing patent. This collar has a central passage 21 therethrough with internal threads 22 adapted to be engaged to external threads 15. A counterbore 23 is provided to give clearance near the base end (right-hand end in FIG. 1) of the nut. A wrench-engaging section 24 includes non-circular, preferably hexagonal peripheral driving surfaces 25 adapted to be engaged by a wrench. A counterbore 26 is provided inside the wrench-engaging section to clear the threads of the pin.

A shear section 27 comprising an external groove axially disposed between the wrench-engaging and threaded sections provides a region of least cross-section which is adapted to shear at a given torque exerted across it, that is between the sections on each side of it. When enough torque is exerted, the collar shears at section 27, leaving the right-hand end of the collar tightened on the pin, and the wrench-engaging section free to fall off.

A flange 28 to the right of the groove in FIG. 1 reinforces the collar at this location. Before the nut is threaded onto the pin, this region of the collar is pressed slightly out of round. The springback force of the collar when rounded out by the pin provides a locking action to hold the collar on the pin.

A washer 30 having a non-circular peripheral section 31 has a hole 32 to pass the pin so that the washer surrounds the pin, not necessarily in close contact. Section 31 is preferably comprised of hexagonal external surfaces which may be engaged by a wrench, but may comprise different shapes and types of wrench-engaging sections, if preferred. The washer has two faces 33, 34, face 34 being adapted to abut the work and bear against the workpiece, and face 33 being adapted to abut and be borne against by the right-hand end of the collar in FIG. 1. Section 31 provides means for holding the washer against rotation relative to the driver frame, or, what is equivalent, around the pin axis.

A driver 40 includes a frame 41 to which is mounted a motor 42 which provides power means. This means includes a shaft-driven gear 43 which engages a second gear 44 integral with a wrench 45, the wrench having a central passage 46, and fastener-engaging surfaces 47 which may conveniently comprise a hexagonal array adapted to engage the wrench-engaging section 24 of the collar. Operation of the motor turns the wrench so as to tighten the collar on the pin.

Pin-engaging means 50 comprises a hexagonal shaft 51 adapted to engage the concave engagement section 16 of the pin. This shaft is held in a matching passage 52 in an adapter 53, by a set screw 54. The adapter is threaded to a shaft 55 which is mounted to a ratchet 56, the details of which need not be illustrated here, because they are completely conventional. The ratchet interconnects shaft 55 with a second shaft 57 and permits relative rotatoin between shafts 55 and 57 only when torque above a predetermined value is applied through shaft 55 to the ratchet. The ratchet therefore acts as an overload release, permitting shaft 55 to rotate before it will twist.

A tooth 58 is mounted to the frame and engages a groove 59 in shaft 57, thereby enabling the pin-engaging means to shift axially of itself against the bias of a spring 60 which is opposed between the shaft and the frame. This permits the pin-engaging means to recede into the frame as the frame moves toward the workpiece with the collar. The device is thereby provided with means for turning the wrench relative to the frame, releasing the pin-engaging means at torque overloads, and for permitting axial shifting of the pin-engaging means.

External means 65 is attached to the frame for engaging the washer. Means 65 comprises a sleeve 66 coaxial with the wrench and surrounding the same and having an opening 67 with internal surfaces 68 adapted to engage the non-circular portion of the washer. This sleeve is axially reciprocable relative to the frame and is mounted thereto by means of shafts 69, 70, at least one of which has a spring 71 opposed between a flange 72 on the sleeve and the frame, thereby biasing the sleeve and its surfaces toward the right in FIG. 1.

FIG. 3 illustrates the set condition of the fastener wherein wrench-engaging section is shown in dotted lines to indicate that it has been sheared when the fastener was fully torqued.

FIG. 4 shows a sheared-off collar 75 threaded onto a modified pin 76. This pin is similar to that shown in FIG. 1, except that it includes splines 77. A washer 78 is the same as washer 30, except that it includes internal splines 79, splines 77 and 79 being adapted to engage each other so that the washer is inherently held against rotation relative to the pin. The collar is the same as the other with the exception that its counterbore may be enlarged by an enlargement 80 to provide for extra clearance, if desired.

In operation, the device of FIG. 1 is set by passing the pin through the aperture in the workpiece, slipping the washer over it and lightly turning the collar onto the threads of the pin. Then the driver is utilized by inserting hexagonal shaft 51 into the recess in the pin, engaging the wrench-engaging section with the wrench, and turning on motor 42. The wrench turns the collar and tightens it down.

Simultaneously, surfaces 68 of sleeve 66 are engaged to the external surfaces of the washer. As the collar is tightened down, the wrench moves along with it and shafts 55 and 57, and external sleeve 66, move to the left relative to the frame in FIG. 1. The ratchet 56 is set for a safe value, which is still high enough to resist necessary torque to hold the pin against rotation. When the nut finally tightens against the washer, a "bootstrap" effect takes place, because at this time the friction forces between the washer and the collar and workpiece become very great, and tend to link the wrench to the frame through the collar and washer. There is therefore generated a closed path of reaction from the wrench through the collar, through the washer, workpiece and through the sleeve 66 back to the frame in which the torque is exerted. The frame (and pin-engaging means) are now held by forces through this closed path, and not by forces through the path that includes the slip between the collar and the pin. Therefore no substantial external torque is felt by the operator. It will be observed that this is a completely closed system and is independent of external forces such as a force exerted on a handle on the frame. The frame therefore does not exert a counter-torque which the operator would have to resist, as it would were the resistance to torque merely derived from holding the frame so that the wrench would drive the collar without internal reference to the frame. Therefore, when the requisite torque builds up to shear the shear section, no shock and no torque will be felt by a person holding the frame. This is a substantial improvement over prior fastener systems, and is derived from the capacity of the frame to hold on to the washer when it is clamped down by the collar.

If at any time excessive force should be exerted on the central shafts, the ratchet will relieve it.

The fastener configuration derived from setting the assembly of FIG. 1 is shown in FIG. 3.

FIG. 4 illustrates a means for dispensing entirely with the central shafts of the tool in FIG. 1, for in this embodiment the external sleeves 66 can engage the washer, the washer itself serving to hold the pin against relative rotation, thereby simplifying the tool. Pin-holding means could, of course, be provided, if desired, but they are optional.

This invention thereby provides a fastener and a fastener system wherein inherently torque-limiting fasteners can be driven by hand-held tools without mechanical shock being exerted on the operator, and without requiring the user to resist substantial torque loads on the frame. This system is principally useful in systems using collars which are inherently torque-limiting, but is equally effective when the torque-limiting feature is contained in the driver, so long as the frame has means for engaging the washer. An example of such a torque-limiting feature is the common torque wrench which releases or ratchets above a preselected torque level.

This invention is not to be limited by the embodiments shown on the drawings and described in the description which are given by way of example and not of limitation, but only in accordance with the scope of the appended claims.

I claim:

1. A tool for applying to a workpiece a fastener of the type having a pin, a collar threaded on the pin and having a shear section, and a washer between the collar and the workpiece comprising a frame, a rotary wrench journaled in the frame, power means in the frame for rotating the wrench, means on the frame for holding the pin stationary, means on the wrench for applying torque to the collar, and means on the frame for gripping the washer, whereby the gripping means absorbs reactive torque when the collar is sheared by the wrench applied torque.

2. A tool for applying to a workpiece a fastener of the type having a pin, a collar threaded on the pin and having a shear section, and a washer between the collar and the workpiece comprising a frame, a rotary wrench journaled in the frame, power means in the frame for rotating the wrench, a central stationary shaft in the frame, said shaft having means for resisting rotation of the pin relative to the shaft, means on the wrench for applying torque to the collar, and means on the frame for gripping the washer, whereby the gripping means absorbs reactive torque when the collar is sheared by wrench applied torque.

3. A tool for applying to a workpiece a fastener of the type having a pin, a collar threaded on the pin and having a shear section, and a washer between the collar and the workpiece comprising a frame, a rotary wrench journaled in the frame, a central stationary shaft in the frame, said shaft having means for resisting rotation of the pin relative to the shaft, a wrench journaled coaxially with the shaft, power means in the frame for rotating the wrench relative to the shaft, said wrench having a socket corresponding to a peripheral driving surface on the collar, and means on the frame for gripping the washer, whereby the gripping means absorbs reactive torque when the collar is sheared by wrench applied torque.

4. A tool for applying to a workpiece a fastener of the type having a pin, a collar threaded on the pin and having a shear section, and a washer between the collar and the workpiece comprising a frame, a rotary wrench journaled in the frame, power means in the frame for rotating the wrench, means on the frame for holding the pin stationary, means on the wrench for applying torque to the collar for threading the collar on the pin, a sleeve secured to the frame and extending coaxially over the wrench, said sleeve having a socket therein in position to engage the washer when the fastener is assembled in a workpiece, whereby the sleeve absorbs reactive torque when the wrench shears the collar.

5. A tool according to claim 4 wherein said socket is non-circular and corresponds to the shape of the periphery of the washer.

References Cited by the Examiner

UNITED STATES PATENTS

| | | | |
|---|---|---|---|
| 2,054,060 | 9/1936 | Morris | 85—61 |
| 2,286,809 | 6/1942 | Hutchison | 29—413 |
| 2,682,188 | 6/1954 | Ferrell | 81—56 X |
| 2,760,394 | 8/1956 | Wragge | 81—55 |
| 2,789,597 | 4/1957 | La Torre | 81—55 X |
| 2,882,773 | 4/1959 | Wing | 81—56 X |
| 3,028,777 | 4/1962 | Essex | 81—55 X |
| 3,040,425 | 6/1962 | Muenchinger | 29—413 |
| 3,041,902 | 7/1962 | Wing | 81—56 X |
| 3,138,987 | 6/1964 | Wing | 85—61 |

FOREIGN PATENTS 809,942   3/1959   Great Britain.

WILLIAM FELDMAN, *Primary Examiner.*

MILTON S. MEHR, *Examiner.*